(12) United States Patent
Williamson et al.

(10) Patent No.: US 11,542,370 B2
(45) Date of Patent: Jan. 3, 2023

(54) AROMATIC ALCOHOL-LIGNIN-ALDEHYDE RESINS AND PROCESSES FOR MAKING AND USING SAME

(71) Applicant: GEORGIA-PACIFIC CHEMICALS LLC, Atlanta, GA (US)

(72) Inventors: Bobby L. Williamson, Conyers, GA (US); Copeland C. Maddix, Lithonia, GA (US)

(73) Assignee: BAKELITE UK HOLDING LTD.

( * ) Notice: Subject to any disclaimer, the term of this patent is extended or adjusted under 35 U.S.C. 154(b) by 0 days.

(21) Appl. No.: 16/770,509

(22) PCT Filed: Dec. 7, 2018

(86) PCT No.: PCT/US2018/064625
§ 371 (c)(1),
(2) Date: Jun. 5, 2020

(87) PCT Pub. No.: WO2019/113554
PCT Pub. Date: Jun. 13, 2019

(65) Prior Publication Data
US 2021/0009764 A1 Jan. 14, 2021

Related U.S. Application Data

(60) Provisional application No. 62/596,228, filed on Dec. 8, 2017.

(51) Int. Cl.
| | | |
|---|---|---|
| *C08H 7/00* | (2011.01) | |
| *C08G 8/10* | (2006.01) | |
| *C08G 8/20* | (2006.01) | |
| *C08G 8/24* | (2006.01) | |
| *C08L 61/12* | (2006.01) | |
| *C08L 97/00* | (2006.01) | |

(52) U.S. Cl.
CPC ............. *C08H 6/00* (2013.01); *C08G 8/10* (2013.01); *C08G 8/20* (2013.01); *C08G 8/24* (2013.01); *C08L 61/12* (2013.01); *C08L 97/005* (2013.01)

(58) Field of Classification Search
CPC ...................................................... C08G 8/24
See application file for complete search history.

(56) References Cited

U.S. PATENT DOCUMENTS

| | | | |
|---|---|---|---|
| 2,786,820 A | 3/1957 | Curt | |
| 3,227,667 A | 1/1966 | Moffitt | |
| 3,296,159 A | 1/1967 | Lissner | |
| 3,658,638 A * | 4/1972 | Ludwig | C09J 161/06 428/529 |
| 3,886,101 A | 5/1975 | Felicetta | |
| 4,105,606 A * | 8/1978 | Forss | C08L 97/02 524/73 |
| 4,306,999 A * | 12/1981 | Adams | C08G 8/28 524/735 |
| RE32,408 E * | 4/1987 | Janiga | C08G 8/28 106/164.4 |
| 4,769,434 A | 9/1988 | van der Klashorst | |
| 5,010,156 A * | 4/1991 | Cook | C08G 14/14 527/403 |
| 9,464,219 B2 | 10/2016 | Pietarinen | |
| 2003/0045665 A1* | 3/2003 | Sudan | C08L 61/06 527/300 |
| 2014/0249271 A1* | 9/2014 | Pietarinen | C09J 197/005 524/799 |
| 2016/0237194 A1 | 8/2016 | Pietarinen | |

FOREIGN PATENT DOCUMENTS

| | | |
|---|---|---|
| CA | 2399171 A1 | 2/2003 |
| EP | 1288237 A2 | 3/2003 |
| WO | WO2017163163 A1 | 9/2017 |

OTHER PUBLICATIONS

Xin-Ping et al. (Preparation of Lignin-Modified Phenol-Formaldehyde Resin Adhesive, Journal of South China University of Technology, Natural Science Edition, vol. 39(11), 2011, 22-29) (Year: 2011).*
Zhao et al. (International Journal of Adhesion & Adhesives 64 (2016) 163-167) (Year: 2016).*
Olivares et al. (Wood Sci. Technol. 22, 157-165, 1988) (Year: 1988).*
Sameni et al. (Bioresources 11(4), 2016, 8435-8456) (Year: 2016).*
Danielson et al., "Kraft lignin in phenol formaldehyde resin. Part 1. Partial replacement of phenol by kraft lignin in phenol formaldehyde adhesives for plywood", Journal of Adhesion Science and Technology, vol. 12, No. 9, 1998, pp. 923-939 (Only English Abstract submitted).
International Search Report and Written Opinion received for PCT patent application No. PCT/US18/64625, dated Mar. 13, 2019, 11 pages.

(Continued)

*Primary Examiner* — Liam J Heincer
(74) *Attorney, Agent, or Firm* — Edmonds & Cmaidalka, PC

(57) ABSTRACT

Aromatic alcohol-lignin-aldehyde resins and process for making and using same. In some examples, a process for making a resin can include heating a first mixture that includes a lignin, an aromatic alcohol, and a base compound to produce a second mixture that can include an activated lignin, the aromatic alcohol, and the base compound. The second mixture can be heated with an aldehyde to produce a third mixture that can include an aromatic alcohol-lignin-aldehyde resin and unreacted free aldehyde. In some examples, an aromatic alcohol-lignin-aldehyde resin can be or include a co-polymer of an activated lignin, an aromatic alcohol, and an aldehyde. A weight ratio of the activated lignin to the aromatic alcohol can be about 20:80 to about 95:5.

19 Claims, No Drawings

(56) References Cited

OTHER PUBLICATIONS

Ouyang et al., "Preparation of lignin-modified phenol-formaldehyde resin adhesive", Huanan Ligong Daxue Xuebao/Journal of South China University of Technology (Natural Science), vol. 39, No. 11, Nov. 2011, pp. 22-29 (Only English abstract submitted).

* cited by examiner

AROMATIC ALCOHOL-LIGNIN-ALDEHYDE RESINS AND PROCESSES FOR MAKING AND USING SAME

CROSS-REFERENCE TO RELATED APPLICATIONS

This application claims priority to PCT Application No. PCT/US18/64625, filed on Dec. 7, 2018, which further claims priority to U.S. Provisional Application No. 62/596,228, filed on Dec. 8, 2017, which are incorporated herein by reference in their entirety.

BACKGROUND

Field

Embodiments described generally relate to aromatic alcohol-lignin-aldehyde resins and processes for making and using same.

Description of the Related Art

Phenolic resins are commercially important materials used in a diverse array of products including coatings, adhesives, tack-building agents in many acrylic, vinyl acrylic, vinyl and rubber latexes, and other binders. Aromatic alcohols and aldehydes used in making these phenolic resins are petroleum derived compounds and thus subject to variations in price and limitations in production quantities. As such, there is an interest in reducing the amount of aromatic alcohols and aldehydes in the production of the phenolic resins.

One approach to reducing the amount of petroleum derived aromatic alcohol has been to use lignin as a reactant in the preparation of the phenolic resins. Lignin is a wood-derived polyphenol polymer that is commonly produced as a by-product from the kraft wood pulping process. Typically, "black liquor" obtained from the kraft process is separated from the wood pulp and the lignin is isolated from the black liquor. Aromatic alcohol-lignin-aldehyde resins can be made by reacting lignin with a phenolic resin and/or an aldehyde/phenol starting material. The amount of lignin capable of being incorporated into the resin, however, is minimal and from a commercial standpoint rather unsuccessful.

There is a need, therefore, for improved aromatic alcohol-lignin-aldehyde resins that include an increased amount of lignin.

SUMMARY

Aromatic alcohol-lignin-aldehyde resins and process for making and using same are provided. In one example, a process for making a resin can include heating a first mixture that includes a lignin, an aromatic alcohol, and a base compound to produce a second mixture that can include an activated lignin, the aromatic alcohol, and the base compound. The second mixture can be heated with an aldehyde to produce a third mixture that can include an aromatic alcohol-lignin-aldehyde resin and unreacted free aldehyde.

In another example, an aromatic alcohol-lignin-aldehyde resin made by heating a first mixture that can include a lignin, an aromatic alcohol, and a base compound to produce a second mixture that can include an activated lignin, the aromatic alcohol and the base compound. The second mixture can be heated with an aldehyde to produce a third mixture that can include the aromatic alcohol-lignin-aldehyde resin and unreacted free aldehyde.

In another example, an aromatic alcohol-lignin-aldehyde resin can be or include a copolymer of an activated lignin, an aromatic alcohol, and an aldehyde. The aromatic alcohol-lignin-aldehyde resin can have a weight ratio of the activated lignin to the aromatic alcohol of about 20:80 to about 95:5. In some examples, the activated lignin can have a ratio of aromatic carbon atoms plus alkenic carbon atoms to aliphatic carbon atoms of about 1.2:1 to about 6:1, based on a quantitative analysis of a $^{13}C$ NMR spectra of the activated lignin.

In another example, an aromatic alcohol-lignin-aldehyde resin can be or include a co-polymer of an activated lignin, an aromatic alcohol, and an aldehyde. A weight ratio of the activated lignin to the aromatic alcohol can be about 20:80 to about 95:5. In some examples, the aromatic alcohol-lignin-aldehyde resin can have a molar ratio of aldehyde to (aromatic alcohol+activated lignin) of about 1.8:1 to about 2.6:1, where a calculation of the molar ratio is based on an average molecular weight of 180 grams per mole for the lignin monomer unit prior to activation of the lignin.

DETAILED DESCRIPTION

It has been discovered that an activated lignin can be produced by heating a mixture that includes one or more lignins, one or more aromatic alcohols, and one or more base compounds. In some examples, the activated lignin can be produced in the presence of the base compound and in the absence of any acid compound. The activated lignin can be used to replace at least a portion of an aromatic alcohol in the synthesis of an aromatic-alcohol-aldehyde resin, thus making an aromatic alcohol-lignin-aldehyde resin. For example, the activated lignin can be co-polymerized with the aromatic alcohol and one or more aldehydes to produce an aromatic alcohol-lignin-aldehyde resin. In another example, the activated lignin can be co-polymerized with the aromatic alcohol and one or more aldehydes to produce an aromatic alcohol-lignin-aldehyde resin and unreacted free aldehyde.

It has been surprisingly and unexpectedly discovered that the amount of activated lignin that can be co-polymerized with the aromatic alcohol and the aldehyde can be significantly greater as compared to when the lignin is not activated. In some examples, the aromatic alcohol-lignin-aldehyde resin can include the activated lignin and the aromatic alcohol in a weight ratio of about 20:80 to about 95:5. In some examples, when unreacted free aldehyde is present, at least a portion of the unreacted free aldehyde can be reacted with an aldehyde scavenger to produce an aromatic alcohol-lignin-aldehyde resin with a reduced amount of free aldehyde.

As used herein, the term "lignin" refers to any polymeric material that is or includes lignin. In some examples, the lignin can be or include, but is not limited to, kraft lignin, lignosulfonates, organosolv lignin, soda lignin, alkali lignin, or any mixture thereof. The lignin can be or include lignin as extracted or otherwise separated from black liquor. In some examples, the kraft lignin can be chemically modified prior to separation from the black liquor. Kraft lignin that has been chemically modified can include one or more organic functional groups and/or one or more inorganic functional groups. Illustrative functional groups can include, but are not limited to, an ether group, a carboxyl group, a carbonyl group, a sulfate group, and/or an alkenyl group. In one or more examples, the lignin can include or exclude cations and/or anions that would otherwise be present in lignin. Illustrative cations that can be present in lignin can include, but are not limited to, sodium, potassium, calcium, or any mixture thereof. Illustrative anions that can be present in lignin can include, but are not limited to, alkoxide, carboxylate, sulfonate, sulfate, or any mixture thereof. In some examples, the lignin can have an ash content that differs from the ash content of kraft lignin. For example, the lignin can have an ash content that is lower than the ash content of kraft lignin. In another example, the lignin can have an ash content that is greater than the ash content of kraft lignin.

Lignin is a high molecular weight phenylpropane polymer that is generally present in an amount of about 24 wt % to about 35 wt % in softwood and in an amount of about 17 wt % to about 25 wt % in hardwood. Lignin is not soluble in water and functions to bond the cellulose fibers of wood together. In commercial kraft pulping processes, wood chips are soaked in an aqueous solution of sodium sulfide and sodium hydroxide at elevated temperatures for a period of time to enable the degradation of the native lignin into a water soluble lignin. The resulting aqueous solution of water soluble lignin is referred to as the black liquor and the kraft lignin can be separated from remaining insoluble cellulose fibers. Black liquor has a pH value of about 13 to about 14. The water soluble lignin can be precipitated out of the black liquor by the addition of an acid such as sulfuric acid, nitric acid, and/or hydrochloric acid. In some commercial processes, the black liquor is first carbonated with carbon dioxide and then precipitated by the addition of sulfuric acid. The resulting precipitate is typically isolated by filtration, washed with additional aliquots of sulfuric acid, washed with water, and then allowed to dry. These treatment steps can produce a lignin filter cake that can have a moisture content from about 1 wt %, about 25 wt %, or about 45 wt % to about 50 wt %, about 70 wt %, or about 75 wt %. For example, the lignin filter cake can have a moisture content of about 1 wt % to about 75 wt %, about 25 wt % to about 45 wt %, or about 50 wt % to about 70 wt %. The lignin filter cake can be dried to remove at least a portion of the water.

In one or more examples, the lignin can be or include kraft lignin, alkali lignin (also referred to as lignin, sodium salt), or a mixture thereof. Kraft lignin and alkali lignin are known materials of commerce. The CAS numbers for kraft lignin and alkali lignin are 8068-05-1 and 37203-80-8, respectively. The kraft lignin can have an average molecular weight of 180 grams per mole for the lignin monomer unit. The kraft lignin, alkali lignin, or a mixture of the kraft lignin and the alkali lignin can include less than 50 wt %, less than 45 wt %, less than 40 wt %, less than 37 wt %, less than 35 wt %, less than 33 wt %, less than 30 wt %, less than 27 wt %, less than 35 wt %, less than 23 wt %, less than 20 wt %, less than 15 wt %, less than 10 wt %, less than 7 wt %, less than 6 wt %, less than 5 wt %, less than 4 wt %, less than 3 wt %, less than 2 wt %, less than 1 wt %, or less than 0.5 wt % of water, based on the total weight of the kraft lignin and/or the alkali lignin. In other examples, the lignin can be lignin that is not kraft lignin. For example, the lignin can be an organosolv lignin. In still other examples the lignin can be or include kraft lignin, an organosolv lignin, alkali lignin, or any mixture thereof.

In one or more examples the lignin can include about 1 wt % to about 10 wt % ash based on a dry weight of the lignin. For example, the lignin can include about 1 wt %, about 1.5 wt %, about 2 wt %, about 2.5 wt %, or about 3 wt % to about 4 wt %, about 5 wt %, about 6 wt %, about 7 wt %, about 8 wt %, about 9 wt %, about 10 wt %, of ash based on a dry weight of the lignin. In one or more examples, the lignin material can be or include kraft lignin and the kraft lignin can include less than 3 wt %, less than 2.7 wt %, less than 2.5 wt %, less than 2.3 wt %, less than 2 wt %, less than 1.7 wt %, less than 1.5 wt %, less than 1.3 wt %, less than 1 wt %, less than 0.9 wt %, less than 0.8 wt %, less than 0.7 wt % less than 0.6 wt %, less than 0.5 wt %, less than 0.4 wt %, less than 0.3 wt %, less than 0.2 wt %, less than 0.1 wt %, less than 0.07 wt %, less than 0.05 wt %, or less than 0.02 wt % of ash, based on a dry weight of the kraft lignin. The ash content of the lignin can be measured according to ASTM D2584-11: Standard Test Method for Ignition Loss of Cured Reinforced Resins.

In some examples, the lignin can include about 1 wt % to about 10 wt % of sulfur based on the dry weight of the lignin. For example, the lignin can include about 1 wt %, about 1.5 wt %, about 2 wt %, about 2.5 wt %, or about 3 wt % to about 4 wt %, about 5 wt %, about 6 wt %, about 7 wt %, about 8 wt %, about 9 wt %, or about 10 wt % of sulfur based on the dry weight of the lignin. In other examples, the lignin can be or include kraft lignin and the kraft lignin can contain less than 5 wt % of sulfur, less than 4.5 wt % of sulfur, less than 4 wt % of sulfur, less than 3.5 wt % of sulfur, less than 3 wt % of sulfur, less than 2.7 wt % of sulfur, less than 2.5 wt % of sulfur, less than 2.3 wt % of sulfur, less than 2 wt % of sulfur, less than 1.7 wt % of sulfur, or less than 1.5 wt % of sulfur based on the dry weight of kraft lignin. The sulfur content of the lignin can be measured or calculated using elemental analysis techniques. For example, the sulfur content of the lignin can be indirectly determined or estimated using CHN analysis, which can be accomplished by combustion analysis. More particularly, a sample of the lignin can be burned in an excess of oxygen, and various traps can collect the combustion products, such as carbon dioxide, water, and nitric oxide. The masses of these combustion products can be used to calculate the composition of the unknown sample.

In some examples, a ratio of aromatic carbon atoms plus alkenic carbon atoms to aliphatic carbon atoms (aromatic carbon atoms+alkenic carbon atoms:aliphatic carbon atoms) in the lignin can be about 1.2:1 to about 6:1 based on quantitative analysis of $^{13}$C NMR spectra of the lignin. For example, a ratio of aromatic carbon atoms plus alkenic carbon atoms to aliphatic carbon atoms (aromatic carbon atoms+alkenic carbon atoms:aliphatic carbon atoms) in the lignin can be about 1.2:1, about 1.3:1, about 1.5:1, about 1.7:1, about 2:1, about 2.3:1, about 2.5:1, or about 2.7:1 to about 3.5:1, about 3.7:1, about 4:1, about 4.3:1, about 4.5:1, about 4.7:1, about 5:1, about 5.3:1, about 5.5:1, about 5.7:1, or about 6:1, based on quantitative analysis of $^{13}$C NMR spectra of the lignin. In another example, the lignin can have a ratio of aromatic carbon atoms plus alkenic carbon atoms to aliphatic carbon atoms of at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the lignin. In another example, the lignin can have a ratio of aromatic carbon atoms plus alkenic carbon atoms to aliphatic carbon atoms of about 1.2:1 to about 2:1, about 1.2:1 to about 1.8:1, about 1.3:1 to about 1.7:1, about 1.4:1 to about 1.6:1, based on quantitative analysis of $^{13}$C NMR spectra of the lignin. In one or more examples, lignin can be or include kraft lignin and the kraft lignin can have a ratio of aromatic carbon atoms plus alkenic carbon atoms to aliphatic carbon atoms of about at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the kraft lignin.

In one or more examples, the lignin can have a water or moisture content of less than 50 wt %, by weight of the lignin. For example, the lignin can have a water or moisture content of less than 50 wt %, less than 45 wt %, less than 40 wt %, less than 37 wt %, less than 35 wt %, less than 33 wt %, less than 30 wt %, less than 27 wt %, less than 35 wt %, less than 23 wt %, less than 20 wt %, less than 17 wt %, less than 15 wt %, less than 13 wt %, less than 10 wt %, less than 9 wt %, less than 8 wt %, less than 7 wt %, less than 6 wt %, less than 5 wt %, less than 4 wt %, less than 3 wt %, less than 2 wt %, less than 1 wt %, or less than 0.5 wt % by weight of the lignin. In another example, the lignin can have a water or moisture content of about 0.5 wt % to about 5.5 wt %, about 1 wt % to about 4.5 wt %, about 1.5 wt % to about 3 wt %, about 2 wt % to about 4 wt %, about 1.7 wt % to about 3.3 wt %, about 1 wt % to about 2.5 wt %, about 0.7 wt % to about 3.5 wt %, about 3 wt % to about 6 wt %, about 4 wt % to about 8 wt %, about 5 wt % to about 7 wt %, about 6 wt % to about 9 wt %, or about 1 wt % to about 9.5 wt % by weight of the lignin. In another example, the lignin can include about 2 wt %, about 5 wt %, about 7 wt %, about 10 wt %, 15 wt %, about 20 wt %, or about 25 wt % to about 30 wt %, about 35 wt %, about 40 wt %, or about 45 wt % of a liquid, e.g., water, and about 55 w % to about 85 wt % of solid material by weight of the lignin.

In one or more examples, the aromatic alcohol can include an aromatic alcohol having a chemical structure of R—(OH)$_n$, where R is an aromatic group of 6 to 24 carbon atoms, and n is an integer of 1 to 15. The aromatic alcohols can be or include any one or more of a number of aromatic alcohols. Illustrative aromatic alcohols can be or include phenol, one or more substituted phenols, one or more unsubstituted phenols, or a mixture of substituted and/or unsubstituted phenols. For example, the phenolic component can be or include phenol itself (monohydroxybenzene). Illustrative substituted phenolic compounds can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol, or any mixture thereof. Dihydric aromatic alcohols such as catechol, resorcinol, hydroquinone, bisphenol A and bisphenol F also can also be used. For example, the aromatic alcohol can be or include, but is not limited to, resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl) ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol, or any mixture thereof. In at least one example, the aromatic alcohol can be or include phenol. The aromatic alcohol can include a mixture of two or more aromatic alcohols combined with one another and/or added independent of one another to the reaction mixture.

The aldehyde can be or include one or more substituted aldehydes, one or more unsubstituted aldehydes, or any mixture of substituted and/or unsubstituted aldehydes. Illustrative aldehydes can include, but are not limited to, aldehydes having the chemical formula RCHO, where R is hydrogen or a hydrocarbyl group. Illustrative hydrocarbyl groups can include 1 carbon atom to about 8 carbon atoms. Suitable aldehydes can also include the so-called masked aldehydes or aldehyde equivalents, such as acetals or hemiacetals. Illustrative aldehydes can include, but are not limited to, formaldehyde, paraformaldehyde, cinnamaldehyde, toluadehyde, acetaldehyde, propionaldehyde, butyraldehyde, furfural, benzaldehyde, retinaldehyde, glyoxal, malondialdehyde, succindialdehyde, glutaraldehyde, phthaldehyde, derivatives thereof, or any mixture thereof. Still other suitable formaldehyde compounds can include formaldehyde present in a prepolymer or pre-condensate such as urea-formaldehyde precondensate (UFC). In at least one example, the aldehyde can be or include formaldehyde.

In one or more examples, the base compound can be or include, but is not limited to, one or more of: an oxide of an alkali metal, an oxide of an alkaline earth metal, a hydroxide of an alkali metal, a hydroxide of an alkaline earth metal, a carbonate of an alkali metal, a carbonate of an alkaline earth metal, a tertiary amine, and a tertiary amino alcohol. Non-limiting examples of tertiary amines and amino alcohols include triethylamine, 2-dimethyl amino-2-methyl-1-propanol and 2-dimethylamino-2-hydroxymethyl-1,3-propanediol. In some examples, base compounds such as sodium hydroxide, lime, sodium carbonate, potassium carbonate, sodium chloride, potassium chloride, and potassium hydroxide can be used. Typically, these base compounds can be added as aqueous solutions. In one or more examples, the first mixture can include a base compound of about 0.05 wt % to about 0.3 wt %, based on the weight of the combined amount of aromatic alcohol and lignin. For example, the first mixture can include a base compound of about 0.05 wt %, about 1 wt %, about 0.1 wt % to about 0.5 wt %, about 0.2 wt % to about 0.4 wt %, about 0.25 wt % to about 0.3 wt % based on the weight of the combined amount of aromatic alcohol and lignin.

The aldehyde scavenger can be or include urea, an aminotriazine or a mixture thereof. Suitable aminotriazine compounds can include melamine, substituted melamines, cycloaliphatic guanamines, or mixtures thereof. Substituted melamines can include the alkyl melamines and aryl melamines which can be mono-, di-, or tri-substituted. In the alkyl substituted melamines, each alkyl group can contain 1-6 carbon atoms and, preferably 1-4 carbon atoms. Typical non-limiting examples of some of the alkyl-substituted melamines can include monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, 1 phenyl radical. Typical non-limiting examples of an aryl-substituted melamine can include monophenyl melamine and diphenyl melamine.

In some examples, the aldehyde scavenger can be or include urea, cycloaliphatic guanamines, 2-cyanoguanidine, ammonium hydroxide, sodium sulfite, sodium bisulfate or a mixture thereof. Illustrative cycloaliphatic guanamines can include, but are not limited to, 2-cyanoguanidine, tetrahydrobenzoguanamine, hexahydrobenzoguanamine, 3-methyl-tetrahydrobenzoguanamine, 3-methyl-hexahydrobenzoguanamine, 3,4-dimethyl-1,2,5,6-tetrahydrobenzoguanamine, and 3,4-dimethylhexahydrobenzoguanamine and mixtures thereof. In at least one example, the cycloaliphatic guanamine can be or include tetrahydrehenzoguanamine. In one or more examples, mixtures of aminotriazines can be used. Illustrative aminotriazine mixtures can be or include, but are not limited to, melamine and an alkyl-substituted melamine, such as dimethyl melamine, or melamine and a cycloaliphatic guanamine, such as tetrahydrobenzoguanamine. In some examples, the aldehyde scavenger can be or include urea.

As noted above, the activated lignin can be produced by heating the mixture of lignin, aromatic alcohol, and base compound. As also noted above, the presence of an acid is not required to produce the activated lignin. As used herein "activated lignin" includes fragmented lignin or lignin fragments. In some examples, the lignin can fragment when heated in the presence of the aromatic alcohol and the base compound. In other examples, the lignin can fragment in the presence of the base compound alone, i.e., in the absence of the aromatic alcohol. The high molecular weight phenylpropane lignin polymers can fragment into lower molecular weight polymer fragments. The activated lignin can include lower molecular weight polymers. The activated lignin can include lignin in a form suitable for reaction with an aromatic alcohol and an aldehyde to produce a resin. For example, when heated with one or more aromatic alcohols and one or more aldehydes, the activated lignin can copolymerize to produce the aromatic-alcohol-lignin-aldehyde resin.

In one or more examples, a first mixture that can be or include the lignin, the aromatic alcohol, and the base compound can be heated at a temperature of about 40° C. to about 100° C. for about 10 minutes to about 6 hours to produce a second mixture that can include the activated lignin, the aromatic alcohol, and the base compound. Heating the first mixture can convert at least a portion of the lignin to the activated lignin. In some examples, the first mixture can be heated or exposed to a temperature of about 50° C. to about 90° C., about 60° C. to about 80° C., about 70° C. to about 90° C., about 80° C. to about 95° C. or about 90° C. to about 100° C. In other examples, the first mixture can be heated or exposed to a temperature of about 40° C. to about 100° C., about 50° C. to about 100° C., about 65° C. to about 100° C., about 70° C. to about 100° C. or about 75° C. to about 90° C. In some examples, the first mixture can be heated for about 10 minutes to about 6 hours, about 15 minutes to about 5 hours, about 20 minutes to about 4 hours, about 25 minutes to about 3 hours or about 30 minutes to about 2 hours. In other examples, the first mixture can be heated or exposed to a temperature of about 50° C., about 55° C., about 60° C., about 70° C., or about 75° C. to about 80° C., about 85° C., about 95° C., or about 100° C. for about 10 minutes, about 15 minutes, about 30 minutes, about 45 minutes, or about 1 hour to about 2 hours, about 3 hours, about 5 hours, or about 10 hours to produce the second mixture that can include the activated lignin, the aromatic alcohol, and the base compound.

In some examples, the first mixture can include the lignin and the aromatic alcohol in a weight ratio of about 20:80 to about 95:5. For example, the first mixture can include the lignin and the aromatic alcohol in a weight ratio of about 20:80, about 25:75, about 30:70, about 35:65, about 40:60, about 45:55, about 50:50, about 55:45, about 60:40, about 65:35, about 70:30, about 75:25, about 80:20, about 85:15, about 90:10, or about 95:5. In another example, the first mixture can include the lignin and the aromatic alcohol in a weight ratio of about 20:80, about 25:75, about 30:70, about 35:65, about 40:60, about 45:55, or about 50:50 to about 55:45, about 60:40, about 65:35, about 70:30, about 75:25, about 80:20, about 85:15, about 90:10, or about 95:5. In other examples, the first mixture can include the lignin and the aromatic alcohol in a weight ratio of at least 20:80, at least 25:75, at least 30:70, at least 35:65, at least 40:60, at least 45:65, at least 50:50, at least 55:45, at least 60:40, at least 65:35, or at least 70:30 to about 75:25, about 80:20, about 85:15, about 90:10, or about 95:5.

In some examples, no acid is necessary to produce activated lignin over the entire range of lignin to aromatic alcohol weight ratios that the first mixture can include. In some examples, the first mixture that can be or include the lignin, the aromatic alcohol, and the base compound can be heated for a sufficient period of time to produce the activated lignin over the entire range of lignin to aromatic alcohol weight ratios in absence of any acid or in the presence of less than 5 wt %, less than 4 wt %, less than 3 wt %, less than 2 wt %, less than 1 wt %, less than 0.7 wt %, less than 0.5 wt %, less than 0.3 wt %, less than 0.1 wt %, less than 0.05 wt %, or less than 0.01 wt % of any acid, based on a total weight of the first mixture.

In some examples, the first mixture can include the lignin and the base compound in a weight ratio of about 60:40 to about 80:20. For example, the first mixture can include the lignin and the base compound in a weight ratio of about 60:40, about 63:37, about 65:35, or about 67:33 to about 70:30, about 75:25, about 77:23, or about 80:20.

In some examples, the second mixture and the aldehyde can be heated at a temperature of about 50° C. to about 100° C. for about 20 minutes to about 8 hours to produce a third mixture. For example, the second mixture and the aldehyde can be heated or exposed to a temperature of about 50° C. to about 90° C., about 60° C. to about 80° C., about 70° C. to about 85° C., about 85° C. to about 95° C. or about 90° C. to about 100° C. for about 20 minutes to about 8 hours, about 10 minutes to about 6 hours, about 15 minutes to about 5 hours, about 20 minutes to about 4 hours, about 25 minutes to about 3 hours or about 30 minutes to about 2 hours. In another example, the second mixture and the aldehyde can be heated or exposed to a temperature of about 50° C., about 55° C., about 60° C., or about 65° C. to about 70° C., about 75° C., about 80° C., about 85° C., about 90° C., about 95° C., or about 100° C. for about 10 minutes, about 15 minutes, about 20 minutes, about 30 minutes, or about 60 minutes to about 2 hours, about 3 hours, about 4 hours, about 6 hours, about 8 hours, about 12 hours, or longer.

In some examples, the second mixture can include the activated lignin and the aromatic alcohol in a weight ratio of about 20:80 to about 95:5. For example, the second mixture can include the activated lignin and the aromatic alcohol in a weight ratio of about 20:80, about 25:75, about 30:70, about 35:65, about 40:60, about 45:55, about 50:50, about 55:45, about 60:40, about 65:35, about 70:30, about 75:25, about 80:20, about 85:15, about 90:10, or about 95:5.

Surprisingly and unexpectedly, it was discovered that greater than 20 wt % of the activated lignin can be included in the second mixture based on the combined weight of the activated lignin and the aromatic alcohol. For example, the second mixture can include about 25 wt %, about 30 wt %, about 35 wt %, about 40 wt %, about 45 wt %, about 50 wt %, or about 55 wt % to about 60 wt %, about 65 wt %, about 75 wt %, about 80 wt %, about 85 wt %, about 85 wt %, about 90 wt %, or about 95 wt % of the activated lignin, based on the combined weight of the activated lignin and the aromatic alcohol.

In some examples, heating the second mixture and the aldehyde can produce the third mixture that can include the aromatic alcohol-lignin-aldehyde resin. In other examples, heating the second mixture and the aldehyde can produce the third mixture that can include the aromatic alcohol-lignin-aldehyde resin and unreacted free aldehyde. In some examples, at least a portion of any unreacted free aldehyde in the third mixture and an aldehyde scavenger can be reacted to provide a fourth mixture that can include the aromatic alcohol-lignin-aldehyde resin and less unreacted free aldehyde, as compared to the amount of unreacted free aldehyde in the third mixture. In some examples, the third mixture can include about 1 wt % to about 15 wt %, about 3 wt % to about 10 wt %, or about 5 wt % to about 7 wt % of unreacted free aldehyde by weight of the third mixture. Reaction of at least a portion of the unreacted free aldehyde with an aldehyde scavenger can reduce the amount of free unreacted aldehyde to about 6.7 wt % or less, about 6.5 wt % or less about 6 wt % or less, about 5.5 wt % or less, about 5 wt % or less, about 4.5 wt % or less about 4 wt % or less, about 3.5 wt % or less, about 3 wt % or less, about 2.5 wt % or less, about 2 wt % or less, about 1.5 wt % or less about 1 wt % or less, or about 0.5 wt % or less, based on the weight of the fourth mixture.

The amount of aldehyde scavenger to be used can be based, at least in part, on the amount of unreacted free aldehyde in the third mixture, whether that amount is predicted, measured, or calculated. The amount of aldehyde scavenger can be about 1 to about 10 molar equivalents per mole, about 2 to about 8 molar equivalents per mole or about 3 to about 6 molar equivalents per mole of free aldehyde in the third mixture.

In some examples, the unreacted free aldehyde in the third mixture and the aldehyde scavenger can be heated to a temperature of about 20° C. to about 100° C. for about 10 minutes to about 8 hours or more. For example, the unreacted free aldehyde in the third mixture and the aldehyde scavenger can be heated to a temperature of about 20° C. to about 100° C., about 30° C. to about 90° C., about 40° C. to about 80° C., about 50° C. to about 70° C., about 60° C. to about 90° C., about 65° C. to about 85° C., about 70° C. to about 80° C., about 75° C. to about 80° C. or about 85° C. to about 100° C. The unreacted free aldehyde in the third mixture and aldehyde scavenger can be heated for about 10 minutes, about 20 minutes, about 30 minutes, about 1 hour, about 2 hours, or about 3 hours to about 4 hours, about 5 hours, about 6 hours, about 7 hours, about 8 hours, or more. The aldehyde scavenger can be added to the third mixture at one time, or a plurality of separate portions of aldehyde scavenger can be added to the third mixture. For example, portions of aldehyde scavenger can be added in intervals of about 3 minutes to about 15 minutes therebetween.

As noted above, the kraft lignin can have an average molecular weight of 180 grams per mole for the lignin monomer unit. In some examples, the aromatic alcohol-lignin-aldehyde resin can be a thermosetting resin. For example, the aromatic alcohol-lignin-aldehyde resin can have a molar ratio of aldehyde to (aromatic alcohol+activated lignin) of about 1:1, about 1.1:1, about 1.2:1, about 1.3:1, about 1.4:1, about 1.5:1, about 1.6:1, about 1.7:1 or about 1.8:1 to about 2:1, about 2.2:1, about 2.3:1, about 2.4:1, about 2.5:1, or about 2.6:1, where the molar ratio is based on an average molecular weight of 180 grams per mole for the lignin monomer unit prior to activation of the lignin. In another example, the aromatic alcohol-lignin-aldehyde resin can have a molar ratio of aldehyde to (aromatic alcohol+activated lignin) of about 2:1 to about 2.6:1, about 2.2:1 to about 2.5:1, or about 2.25:1 to about 2.45:1, the molar ratio is based on an average molecular weight of 180 grams per mole for the lignin monomer unit prior to activation of the lignin. In other examples, the aromatic alcohol-lignin-aldehyde resin can be a thermoplastic resin. For example, the aromatic alcohol-lignin-aldehyde resin can have a molar ratio of aldehyde to (aromatic alcohol+activated lignin) of about 0.6:1, about 0.65:1, or about 0.7:1 to about 0.75:1, about 0.8:1, about 0.85:1, or about 0.9:1, the molar ratio is based on an average molecular weight of 180 grams per mole for the lignin monomer unit prior to activation of the lignin. In another example, the aromatic alcohol-lignin-aldehyde resin can have a molar ratio of aldehyde to (aromatic alcohol+activated lignin) of about 0.6:1 to about 0.85:1, about 0.65:1 to about 0.8:1, or about 0.6:1 to about 0.75:1, the molar ratio is based on an average molecular weight of 180 grams per mole for the lignin monomer unit prior to activation of the lignin.

In some examples, the aromatic alcohol-lignin-aldehyde resin can have a solids content of about 30 wt % to about 70 wt %, based on a total weight of the aromatic alcohol-lignin-aldehyde resin. In one or more examples, the aromatic alcohol-lignin-aldehyde resin can include about 30 wt %, about 35 wt %, about 40 wt %, or about 45 wt % to about 50 wt %, about 55 wt %, about 60 wt %, about 65 wt %, or about 70 wt % of solids, based on a total weight of the aromatic alcohol-lignin-aldehyde resin. In some examples, the third mixture and/or the fourth mixture can include about 30 wt %, about 35 wt %, about 40 wt %, or about 45 wt % to about 50 wt %, about 55 wt %, about 60 wt %, about 65 wt %, or about 70 wt % of solids, based on a total weight of the third mixture or the fourth mixture.

In some examples, the aromatic alcohol-lignin-aldehyde resin with a solids content of about 40 wt % to about 60 wt %, can have a viscosity of about 500 cP to 1,500 cP at a temperature of about 25° C. For example, the aromatic alcohol-lignin-aldehyde resin can have a viscosity of about 500 cP to about 600 cP, about 600 cP to about 700 cP, about 700 cP to about 800 cP, about 800 cP to about 900 cP, about 900 cP to about 1,000 cP, about 1,000 cP to about 1,100 cP, about 1,100 cP to about 1,200 cP, about 1,200 cP to about 1,300 cP, about 1,300 cP to about 1,400 cP, or about 1400 cP to about 1,500 cP at a temperature of about 25° C. and a solids content of about 40 wt % to about 60 wt %. The viscosity of the aromatic alcohol-lignin-aldehyde resin can be measured according to ASTM D1084-16. Similarly, the third mixture and/or the fourth mixture can have a viscosity of about 500 cP to about 600 cP, about 600 cP to about 700 cP, about 700 cP to about 800 cP, about 800 cP to about 900 cP, about 900 cP to about 1,000 cP, about 1,000 cP to about 1,100 cP, about 1,100 cP to about 1,200 cP, about 1,200 cP to about 1,300 cP, about 1,300 cP to about 1,400 cP, or about 1400 cP to about 1,500 cP at a temperature of about 25° C. and a solids content of about 40 wt % to about 60 wt %. The viscosity of the aromatic alcohol-lignin-aldehyde resin, the third mixture, and/or the fourth mixture can be measured according to ASTM D1084-16. The viscosity can be measured using a Model DV-II+ viscometer, commercially available from Brookfield Company, Inc., with a small sample adapter, for example, a number 3 spindle. The small sample adapter can allow the sample to be cooled or heated by the chamber jacket to maintain the temperature of the sample surrounding the spindle at a temperature of about 25° C.

In one or more examples, the aromatic alcohol-lignin-aldehyde resin can include the activated lignin and the aromatic alcohol in a weight ratio of about 20:80 to about 95:5. In one or more examples, the aromatic alcohol-lignin-aldehyde resin can include the activated lignin and the aromatic alcohol in a weight ratio of about 20:80, about 25:75, about 30:70, about 35:65, about 40:60, about 45:55, about 50:50, about 55:45, about 60:40, about 65:35, about 70:30, about 75:25, about 80:20, about 85:15, about 90:10, or about 95:5. In other examples, the aromatic alcohol-lignin-aldehyde resin can include the activated lignin and the aromatic alcohol in a weight ratio of about 20:80, about 25:75, about 30:70, about 35:65, about 40:60, or about 45:55 to about 50:50, about 55:45, about 60:40, about 65:35, about 70:30, about 75:25, about 80:20, about 85:15, about 90:10, or about 95:5. Surprisingly and unexpectedly, it was discovered that greater than 20 wt % of the activated lignin can be co-polymerized with the aromatic alcohol and the aldehyde to produce the aromatic alcohol-lignin-aldehyde resin, based on the combined weight of the activated lignin and the aromatic alcohol. For example, the aromatic alcohol-lignin-aldehyde resin can include about 25 wt %, about 30 wt %, about 35 wt %, about 40 wt %, about 45 wt %, about 50 wt %, or about 55 wt % to about 60 wt %, about 65 wt %, about 75 wt %, about 80 wt %, about 85 wt %, about 85 wt %, about 90 wt %, or about 95 wt % of the activated lignin, based on the combined weight of the activated lignin and the aromatic alcohol.

In some examples, the aromatic alcohol-lignin-aldehyde resin can include an activated lignin derived from a kraft lignin, an organosolv lignin, a lignosulfonate, an alkali lignin, or a mixture thereof. In one or more examples, the activated lignin in the aromatic alcohol-lignin-aldehyde resin can have aromatic carbon atoms plus alkenic carbon atoms to aliphatic carbon atoms in a ratio of about 1.2:1 to about 6:1 based on a quantitative analysis of a $^{13}$C NMR spectra of the activated lignin. In one or more examples, a ratio of aromatic carbon atoms plus alkenic carbon atoms to aliphatic carbon atoms (aromatic carbon atoms+alkenic carbon atoms:aliphatic carbon atoms) in the activated lignin can be about 1.2:1, about 1.3:1, about 1.5:1, about 1.7:1, about 2:1, about 2.3:1, about 2.5:1, or about 2.7:1 to about 3.5:1, about 3.7:1, about 4:1, about 4.3:1, about 4.5:1, about 4.7:1, about 5:1, about 5.3:1, about 5.5:1, about 5.7:1, or about 6:1, based on quantitative analysis of $^{13}$C NMR spectra of the activated lignin. In one example, the activated lignin can have a ratio of aromatic carbon atoms plus alkenic carbon atoms to aliphatic carbon atoms of at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on quantitative analysis of $^{13}$C NMR spectra of the activated lignin. In another example, the activated lignin can have a ratio of aromatic carbon atoms plus alkenic carbon atoms to aliphatic carbon atoms of about 1.2:1 to about 2:1, about 1.1:1 to about 1.9:1, about 1.2:1 to about 1.8:1, about 1.3:1 to about 1.7:1, about 1.4:1 to about 1.6:1, based on quantitative analysis of $^{13}$C NMR spectra of the activated lignin. In one or more examples, the activated lignin can be or include an activated kraft lignin and the activated kraft lignin can have a ratio of aromatic carbon atoms plus alkenic carbon atoms to aliphatic carbon atoms of about at least 2.5:1, at least 2.7:1, at least 3:1, at least 3.3:1, at least 3.5:1, at least 3.7:1, at least 4:1, at least 4.3:1, at least 4.5:1, at least 4.7:1, or at least 5:1 to about 5.3:1, about 5.5:1, about 5.7:1, or about 6:1, based on a quantitative analysis of a $^{13}$C NMR spectra of the activated kraft lignin.

The aromatic alcohol-lignin-aldehyde resin can have a molar ratio of the aldehyde to a combined amount of aromatic alcohol and lignin (moles of aldehyde to moles of (aromatic alcohol and lignin) from a low of about 1.70:1 to a high of about 2.60:1. For example, the aromatic alcohol-lignin-aldehyde resin can have a molar ratio of the aldehyde to a combined amount of aromatic alcohol and lignin (moles of aldehyde to moles of (aromatic alcohol and lignin) of about 1.70:1 to about 2.60:1, about 1.80:1 to about 2.55:1, about 1.90:1 to about 2.50:1, or about 2.00:1 to about 2.45:1.

In some examples, the aromatic alcohol-lignin-aldehyde resin can have a gel time of about 20 minutes to about 30 minutes. In one or more examples, the aromatic alcohol-lignin-aldehyde resin can have and a gel time of about 20 minutes, about 22 minutes, about 24 minutes, about 26 minutes, about 28 minutes or about 30 minutes. In other examples, the aromatic alcohol-lignin-aldehyde resin can have and a gel time of about 10 minutes, about 15 minutes, about 20 minutes, about 22 minutes, or about 24 minutes to about 26 minutes, about 28 minutes, about 30 minutes, about 35 minutes, or about 40 minutes.

The gel time can be measured according to the following gel time method. About 10 g sample of each resin being tested can be added to an 18×150 mm pyrex test tube. A wooden applicator stick (Fisher, 01-340) can be inserted into the test tube. A Techne Incorporated's GT-4 gel meter can be used. The "hold-operate" switch can be placed in the "operate" position and the plunger on the gel meter can be tapped to trigger the red light, so that the meter is in the stopped position. The "hold-operate" switch can be placed in the "hold" position and the "zero" button can be pressed to clear the time display. The test tube can be placed into a boiling bath of water at 100° C., using the stopper for alignment and the "start" button can be pressed. The wooden stick can be connected to the plunger by inserting the top of the stick into the connector. The height of the sample can be adjusted, by either adjusting the jack stand or moving the height of the meter, so that the stick is 0.25 inches from the bottom of the test tube at its lowest point, and in the middle of the test tube, not touching the sides. The "hold-operate" switch can be positioned to "operate" to activate the gel-point sensor. The timer and motor automatically stop when the gel point is reached and the time is recorded. Two tests for each example can be carried out and the reported value can be the average of the two tests.

In yet another example, is an aromatic alcohol-lignin-aldehyde resin including a co-polymer of an activated lignin, an aromatic alcohol, and an aldehyde. The activated lignin can have aromatic carbon atoms plus alkenic carbon atoms to aliphatic carbon atoms in a ratio of about 1.2:1 to about 6:1 based on a quantitative analysis of a $^{13}$C NMR spectra of the activated lignin. The activated lignin to the aromatic alcohol weight ratio can be about 20:80 to about 95:5 in the aromatic alcohol-lignin-aldehyde resin. The aromatic alcohol-lignin-aldehyde resin can include random co-polymers, block co-polymers or mixtures thereof. In one or more examples, the aromatic alcohol-lignin-aldehyde resin can have a solids content of about 40 wt % to about 60 wt %, a viscosity of about 500 cP to about 1,500 cP at a temperature of about 25° C., as measured according to ASTM D1084-16, and a gel time of about 20 minutes to about 30 minutes.

Examples

In order to provide a better understanding of the foregoing discussion, the following non-limiting examples are offered. Although the examples may be directed to specific examples, they are not to be viewed as limiting the invention in any specific respect. All parts, proportions, and percentages are by weight unless otherwise indicated.

Example-I: 50% phenol replacement with kraft lignin. To a 5 L reactor equipped with a mechanical stirrer, a thermocouple, and a reflux condenser was added water (about 1,244.8 g). While stirring, 50% caustic (about 421.2 g, 5.265 moles) was added slowly to increase pH to about 12 to about 13.8. Then, 65% kraft lignin (about 982.9 g) was added slowly, under high shear mixing. During the addition of lignin, the temperature was increased to about 50° C. When addition was completed, the mixture was stirred at about 50° C. for 35 minutes. Then phenol (about 639.1 g, 6.791 moles) was added slowly. The reaction mixture was heated to about 80° C. and held at this temperature for about 45 minutes. At this point, 50% formaldehyde (about 1,397.2 g, 23.264 moles) was added evenly over about 45 minutes while maintaining the temperature at about 80° C. to about 82° C. After addition of the formaldehyde, the reaction was allowed to exotherm to about 96° C. over a time period of about 15 minutes and then cooled to about 85° C. over a time period of about 10 minutes. Then, 50% urea solution (about 312.0 g, 5.195 moles) was added over a time period of about 5 minutes and the reaction mixture was cooled to about 81° C. over a time period of about 5 minutes. The second portion of 50% caustic was added (about 202.8 g, 2.535 moles) over a time period of about 5 minutes to about 6 minutes while maintaining the temperature at about 81° C. The reaction mixture was stirred for an additional time period of about 45 minutes at a temperature of about 81° C., which allowed the viscosity to increase from about 207 cP to about 780 cP. At this point, the reaction mixture was cooled to about 50° C. over a time period of about 20 minutes and then to a temperature of about 25° C. over a time period of about 15 minutes.

Example-II: 40% phenol replacement with kraft lignin. To a 5 L reactor equipped with a mechanical stirrer, a thermocouple, and a reflux condenser was added water (about 1,274.4 g). While stirring, 50% caustic (about 421.2 g, 5.265 moles) was added slowly to increase pH to about 12 to about 13.8. Then, 65% kraft lignin (about 773.9 g) was added slowly, under high shear mixing. During the addition of lignin, the temperature was increased to about 50° C. When addition was completed, it was stirred at a temperature of about 50° C. for about 35 minutes. Then phenol (about 754.5 g, 8.017 moles) was added slowly. The reaction mixture was heated to a temperature of about 80° C. and held at this temperature for about 45 minutes. At this point, 50% formaldehyde (about 1,461.2 g, 24.329 moles) was added evenly over a time period of about 45 minutes while maintaining the temperature at about 80° C. to about 82° C. After addition of formaldehyde, the reaction was allowed to exotherm to about 96° C. over a time period of about 15 minutes and then cooled to about 85° C. over a time period of about 10 minutes. Then, 50% urea solution (about 312.0 g, 5.195 moles) was added over a time period of about 5 minutes and the reaction mixture was cooled to about 81° C. over a time period of about 5 minutes. The second portion of 50% caustic was added (about 202.8 g, 2.535 moles) over a time period of about 5 minutes to about 6 minutes while maintaining the temperature at about 81° C. The reaction mixture was stirred for an additional 45 minutes at about 81° C., which allowed the viscosity increase to about 830 cP. At this point, the reaction mixture was cooled to a temperature of about 50° C. over a time period of about 20 minutes and then to a temperature of about 25° C. over a time period of about 15 minutes.

Example-III: 30% phenol replacement with kraft lignin. To a 5 L reactor equipped with a mechanical stirrer, a thermocouple, and a reflux condenser was added water (about 1,302.0 g). While stirring, 50% caustic (about 421.2 g, 5.265 moles) was added slowly to increase the pH to about 12 to about 13.8. Then, 65% kraft lignin (about 571.6 g) was added slowly, under high shear mixing. During the addition of lignin, the temperature was increased to a temperature of about 50° C. When addition was completed, the mixture was stirred at a temperature of about 50° C. for about 35 minutes. Then phenol (about 866.8 g, 9.211 moles) was added slowly. The reaction mixture was heated to about 80° C. and held at this temperature for about 45 minutes. At this point, 50% formaldehyde (about 1,523.6 g, 25.368 moles) was added evenly over a time period of about 45 minutes while maintaining the temperature at about 80° C. to about 82° C. After addition of formaldehyde, the reaction was allowed to exotherm to about 96° C. over a time period of about 15 minutes and then cooled to about 85° C. over a time period of about 10 minutes. Then, 50% urea solution (about 312.0 g, 5.195 moles) was added over a time period of about 5 minutes and the reaction mixture was cooled to about 81° C. over a time period of about 5 minutes. The second portion of 50% caustic was added (about 202.8 g, 2.535 moles) over a time period of about 5 minutes to about 6 minutes while maintaining the temperature at about 81° C. The reaction mixture was stirred for about 240 minutes at a temperature of about 81° C., which allowed the viscosity to increase from about 50 cP to about 930 cP. At this point, the reaction mixture was cooled to a temperature of about 50° C. over a time period of about 20 minutes and then to about 25° C. over a time period of about 15 minutes.

Example-IV: About 709.5 g of water, about 233.3 g of 50% caustic, about 312.7 g of 65% kraft lignin, and about 474.3 g of phenol were added to a reactor vessel and heated to 80° C. with mixing. Samples were withdrawn from the reactor vessel before heating (time=0 sample) and after 15, 30, 45, 60, 75, and 90 minutes of heating. The samples were then washed multiple times with water to remove the phenol and dried. The dried samples were analyzed by 2D NMR. The 2D NMR results showed that the degree of polymerization of the kraft lignin decreased gradually and reached a minimum after 60 minutes of heating at 80° C. This result confirmed that the kraft lignin was fragmented by the heat and caustic treatment.

Example-V: About 709.5 g of water, about 233.3 g of 50% caustic, about 312.7 g of 65% kraft lignin, and about 474.3 g of phenol were added to a reactor vessel and heated to 95° C. with mixing. Samples were withdrawn from the reactor vessel before heating (time=0 sample) and after 15, 30, 45, 60, 75, and 90 minutes of heating. The samples were then washed multiple times with water to remove the phenol and dried. The dried samples were analyzed by 2D NMR. The 2D NMR results showed that the degree of polymerization of the kraft lignin decreased gradually and reached a minimum after 30 minutes of heating at 95° C. This result further confirmed that the kraft lignin was fragmented by the heat and caustic treatment.

Example-VI: 30% phenol replacement with kraft lignin. To a 5.0 L reactor equipped with a mechanical stirrer, a thermocouple, and a reflux condenser was added water (about 299 g). While stirring, a 50% aqueous solution of sodium hydroxide (about 410 g, about 5.125 moles) was added slowly to increase the pH to about 12 to about 13.8. Under high shear mixing, a 65% kraft lignin (about 699.6 g) was added slowly. During the addition of lignin, the temperature was increased to about 50° C. When addition of the lignin was completed, it was allowed to stir at about 50° C. for about 120 min. Then phenol (about 1,061 g, about 11.274 moles) was added slowly. The reaction mixture was heated to about 80° C. and held at this temperature for about 45 min. At this point, a 50% aqueous solution of formaldehyde (about 2,030.5 g, about 33.808 moles) was added evenly over about 70 min while maintaining the mixture at a temperature of about 80° C. to about 82° C. After the addition of formaldehyde, the reaction was allowed to exotherm to a temperature of about 90° C. over about 15 min, held at about 90° C. for about 15 min, and then cooled to about 75° C. over about 10 min. The reaction was allowed to stir for about 35 min at about 75° C. which allowed the viscosity to increase from about 330 cP to about 590 cP. At this point, the reaction mixture was cooled to about 65° C. over about 15 min. The reaction was allowed to stir for an additional time period of about 35 min at about 65° C. during which time the viscosity increased from about 710 cP to about 1,100 cP. The reaction mixture was cooled to about 50° C. over about 15 min, and then urea prill (about 500 g, about 8.325 moles) was added over a time period of about 5 min and the reaction was cooled to a temperature of about 25° C. over about 15 min to afford a final viscosity of about 485 cP.

Example VII: 30% phenol replacement with kraft lignin. To a 5.0 L reactor equipped with a mechanical stirrer, a thermocouple, and a reflux condenser was added water (about 362.6 g). While stirring, a 50% aqueous solution of sodium hydroxide (about 410 g, about 5.125 moles) was added slowly to increase the pH to about 12 to about 13.8. Under high shear mixing, 65% kraft lignin (about 634.4 g) was added slowly. During the addition of lignin, the temperature was increased to a temperature of about 50° C. When addition was completed, the mixture was allowed to stir at about 50° C. for about 25 min. Then phenol (about 962 g, about 10.222 moles) was added slowly. The reaction mixture was heated to about 80° C. and held at this temperature for about 45 min. At this point, a 50% aqueous solution of formaldehyde (about 640 g, about 10.656 moles) was added evenly over about 15 min while allowing the temperature to exotherm to about 96° C. After addition of formaldehyde, the reaction was held at about 90° C. for about 40 min and then cooled to about 81° C. over a time period of about 10 min. Then a 50% aqueous solution of sodium hydroxide (about 105 g, about 1.313 moles) was added over about 5 min at a temperature of about 81° C. Then a 50% aqueous solution of formaldehyde (about 1,201 g, about 19.997 moles) was added evenly over about 30 min while cooling to about 70° C. The reaction was allowed to stir for about 120 min at about 70° C. during which time the viscosity increased from about 115 cP to about 455 cP. At this point, the reaction mixture was cooled to about 57° C. over about 10 min and then urea prill (about 685 g, about 11.405 moles) was added over about 10 min. The reaction was cooled to about 25° C. over an additional time period of about 15 min to afford a final viscosity of about 175 cP.

RESI-STRAND® 159C45 is a phenol formaldehyde oriented strandboard resin that is commercially-available from Georgia-Pacific Chemicals, LLC, and was used as a benchmark to compare the performance of the two experimental kraft lignin-modified PF oriented strandboard resins prepared in Examples VI and VII when used to manufacture oriented strandboard.

Oriented strandboard (OSB) panels having dimensions of about 45.7 cm×about 45.7 cm×about 1 cm (about 18"×about 18"×about 0.375") and a target density of about 0.6 g/cm$^3$ (about 38 lb/ft$^3$) were manufactured as single-layer constructions using Southern Yellow Pine furnish at a moisture content of about 4 wt % and a resin application rate of about 3.25 w %, based on an oven dried weight of the furnish (ODW). PROWAX® 561 slack wax was incorporated in the panels at a loading of about 1 wt % ODW. A single-opening hot press with about 61 cm×61 cm (about 24"×about 24") platens was used at a pressing temperature of about 210° C. (about 410° F.) to manufacture the panels at total press times of about 150 seconds to about 195 seconds depending on the cure speed of each of the resins. A closing time to final pressing position of about 40 seconds and a degas cycle of about 15 seconds was used while pressing each of the panels.

All panels were tested for internal bond strength (IB, kPa), thickness (mm), density (g/cm$^3$), water absorption (Water ABS, %), and thickness swell (TS, %). The internal bond strength was measured according to ASTM D 1037-12. For each example (C1, Ex. 1, and Ex. 2), the average IB for 12 samples is reported for the 150 seconds and 165 seconds press time. For example C1 and Ex. 1 an average IB for 24 samples is reported for the 180 second press time. For Ex. 2 the average IB for 12 samples and 24 samples is reported for the 180 second press time and the 195 second press time, respectively. The panel average thickness was calculated as the average of the eight measurements taken 25.4 mm (1.0 inch) in from each corner and the edge of the mid-length of each panel edge using a Mitutoyo digimatic micrometer No. 323-350, and the average of 4 samples is reported for example C1, Ex. 1, and Ex. 2 for the 150 seconds and 165 seconds press time in the Table below. For Ex. 2 the panel average thickness for 4 samples is reported for the 180 second press time. For example C1 and Ex. 1 a panel average thickness for 8 samples is reported for the 180 second press time. For Ex. 2 a panel average thickness for 8 samples is reported for the 195 second press time. The density was calculated using the thickness and weight data measured for each sample is reported in the Table below. The water absorption was measured according to ASTM D 1037-12 for 24-hour submersion and an average of two samples is reported in the Table below. The thickness swell was measured according to ASTM D1037-12 for 24-hour submersion and an average of two samples is reported in the Table below.

TABLE

| Example | Resin | Press Time (seconds) | IB (kPa) | Thickness (mm) | Density (g/cm$^3$) | Water ABS (%) | Thickness Swell (%) |
|---|---|---|---|---|---|---|---|
| C1 | 159C45 | 150 | 442 | 9.936 | 0.544 | 94.2 | 30.1 |
| Ex. 1 | VI | 150 | 293 | 9.757 | 0.550 | 56.1 | 27.5 |
| Ex. 2 | VII | 150 | 241 | 9.562 | 0.560 | 83.6 | 34.9 |
| C1 | 159C45 | 165 | 394 | 9.441 | 0.597 | 90.5 | 41.7 |
| Ex. 1 | VI | 165 | 301 | 10.123 | 0.530 | 58.0 | 24.5 |
| Ex. 2 | VII | 165 | 257 | 9.667 | 0.540 | 81.7 | 36.2 |

TABLE-continued

| Example | Resin | Press Time (seconds) | IB (kPa) | Thickness (mm) | Density (g/cm$^3$) | Water ABS (%) | Thickness Swell (%) |
|---|---|---|---|---|---|---|---|
| C1 | 159C45 | 180 | 420 | 9.315 | 0.568 | 91.1 | 36.8 |
| Ex. 1 | VI | 180 | 511 | 9.628 | 0.561 | 49.5 | 24.2 |
| Ex. 2 | VII | 180 | 261 | 9.173 | 0.590 | 68.0 | 34.8 |
| Ex. 2 | VII | 195 | 440 | 9.740 | 0.570 | 73.8 | 35.0 |

The results in the Table above show that the two experimental kraft lignin-modified PF oriented strandboard resins are slightly slower curing than the control PF oriented strandboard resin, but ultimately afford boards with equal or superior final bond strength and water absorption/thickness swell properties when cured.

Embodiments of the present disclosure further relate to any one or more of the following paragraphs:

1. A process for making a resin, comprising: heating a first mixture comprising a lignin, an aromatic alcohol, and a base compound to produce a second mixture comprising an activated lignin, the aromatic alcohol and the base compound; and heating the second mixture and an aldehyde to produce a third mixture comprising an aromatic alcohol-lignin-aldehyde resin and unreacted free aldehyde.

2. The process according to paragraph 1, further comprising reacting at least a portion of the unreacted free aldehyde in the third mixture and an aldehyde scavenger to produce a fourth mixture comprising the aromatic alcohol-lignin-aldehyde resin and the unreacted free aldehyde, wherein an amount of the unreacted free aldehyde in the fourth mixture is less than an amount of the unreacted free aldehyde in the third mixture.

3. The process according to paragraph 1 or 2, wherein the aldehyde scavenger comprises urea, an aminotriazine, a cycloaliphatic guanamine, 2-cyanoguanidine, ammonium hydroxide, sodium sulfite, sodium bisulfite, or a mixture thereof.

4. The process according to any one of paragraphs 1 to 3, wherein the aldehyde scavenger comprises urea.

5. The process according to any one of paragraphs 1 to 4, wherein the fourth mixture comprises less than 2 wt % of any unreacted free aldehyde, based on a weight of the fourth mixture.

6. The process according to any one of paragraphs 1 to 5, wherein the unreacted free aldehyde in the third mixture is reacted with about 1 molar equivalent of the aldehyde scavenger to about 10 molar equivalents of the aldehyde scavenger per mole of the unreacted free aldehyde.

7. The process according to any one of paragraphs 1 to 6, wherein at least a portion of the unreacted free aldehyde in the third mixture and the aldehyde scavenger are reacted at a temperature of about 20° C. to about 100° C. for about 10 minutes to about 8 hours to produce the fourth mixture.

8. The process according to any one of paragraphs 1 to 7, wherein the aromatic alcohol comprises an aromatic alcohol having a chemical structure of R—(OH)$_n$, wherein R is an aromatic group of 6 to 24 carbon atoms, and n is an integer of 1 to 15.

9. The process according to any one of paragraphs 1 to 8, wherein the aromatic alcohol comprises phenol.

10. The process according to any one of paragraphs 1 to 9, wherein the base compound comprises an oxide of an alkali metal, an oxide of an alkaline earth metal, a hydroxide of an alkali metal, a hydroxide of an alkaline earth metal, a carbonate of an alkali metal, a carbonate of an alkaline earth metal, a tertiary amine, a tertiary amino alcohol, or a mixture thereof.

11. The process according to any one of paragraphs 1 to 10, wherein the lignin comprises a kraft lignin, a lignosulfonate, an organosolv lignin, an alkali lignin, or a mixture thereof.

12. The process according to any one of paragraphs 1 to 11, wherein the lignin has aromatic carbon atoms plus alkenic carbon atoms to aliphatic carbon atoms in a ratio of about 1.2:1 to about 6:1 based on a quantitative analysis of a $^{13}$C NMR spectra of the lignin.

13. The process according to any one of paragraphs 1 to 12, wherein the lignin comprises less than 3 wt % of ash, as measured according to ASTM D2584-11.

14. The process according to any one of paragraphs 1 to 13, wherein the first mixture is heated at a temperature of about 40° C. to about 100° C. for about 10 minutes to about 6 hours to produce the second mixture.

15. The process according to any one of paragraphs 1 to 14, wherein the second mixture and the aldehyde are heated at a temperature of about 50° C. to about 100° C. for about 20 minutes to about 8 hours to produce the third mixture.

16. The process according to any one of paragraphs 1 to 15, wherein the first mixture comprises the lignin and the aromatic alcohol in a weight ratio of about 20:80 to about 95:5.

17. The process according to any one of paragraphs 1 to 16, wherein the activated lignin comprises fragmented lignin.

18. The process according to any one of paragraphs 1 to 17, wherein the second mixture comprises the activated lignin and the aromatic alcohol in a weight ratio of about 20:80 to 95:5.

19. The process according to any one of paragraphs 1 to 18, wherein the first mixture has a pH of about 10 to about 14 at a temperature of about 25° C.

20. An aromatic alcohol-lignin-aldehyde resin made by heating a first mixture comprising a lignin, an aromatic alcohol, and a base compound to produce a second mixture comprising an activated lignin, the aromatic alcohol and the base compound; and heating the second mixture and an aldehyde to produce a third mixture comprising an aromatic alcohol-lignin-aldehyde resin and unreacted free aldehyde.

21. The aromatic alcohol-lignin-aldehyde resin according to paragraph 20, wherein the lignin comprises a kraft lignin, an organosolv lignin, a lignosulfonate, an alkali lignin, or a mixture thereof.

22. The aromatic alcohol-lignin-aldehyde resin according to paragraph 20 or 21, wherein the activated lignin has aromatic carbon atoms plus alkenic carbon atoms to aliphatic carbon atoms in a ratio of about 1.2:1 to about 6:1 based on a quantitative analysis of a $^{13}$C NMR spectra of the activated lignin.

23. The aromatic alcohol-lignin-aldehyde resin according to any one of paragraphs 20 to 22, wherein the activated lignin comprises fragmented lignin.

24. The aromatic alcohol-lignin-aldehyde resin according to any one of paragraphs 20 to 23, wherein the lignin comprises kraft lignin, the aromatic alcohol comprises phenol, and the aldehyde comprises formaldehyde.

25. The aromatic alcohol-lignin-aldehyde resin according to any one of paragraphs 20 to 24, wherein a weight ratio of the activated lignin to the aromatic alcohol in the second mixture is about 20:80 to about 95:5.

26. The aromatic alcohol-lignin-aldehyde resin according to any one of paragraphs 20 to 25, wherein the aromatic alcohol-lignin-aldehyde resin has a solids content of about 40 wt % to about 60 wt % based on a weight of the aromatic alcohol-lignin-aldehyde resin, a viscosity of about 500 cP to about 1,500 cP at a temperature of about 25° C., as measured according to ASTM D1084-16, and a gel time of about 20 minutes to about 30 minutes.

27. An aromatic alcohol-lignin-aldehyde resin made by heating a first mixture comprising a lignin, an aromatic alcohol, and a base compound to produce a second mixture comprising an activated lignin, the aromatic alcohol, and the base compound; heating the second mixture and an aldehyde to produce a third mixture comprising an aromatic alcohol-lignin-aldehyde resin and unreacted free aldehyde; and reacting an aldehyde scavenger and at least a portion of the unreacted free aldehyde in the third mixture.

28. The aromatic alcohol-lignin-aldehyde resin according to paragraph 27, wherein the lignin comprises kraft lignin, the aromatic alcohol comprises phenol, and the aldehyde comprises formaldehyde and the aldehyde scavenger comprises urea.

29. The aromatic alcohol-lignin-aldehyde resin according to paragraph 27 or 28, having a solids content of about 40 wt % to about 60 wt % based on a weight of the aromatic alcohol-lignin-aldehyde resin, a viscosity of about 500 cP to about 1,500 cP at a temperature of about 25° C., as measured according to ASTM D1084-16, a gel time of about 20 minutes to about 30 minutes, and less than 2 wt % of any unreacted free aldehyde, based on a weight of the aromatic alcohol-lignin-aldehyde resin.

30. An aromatic alcohol-lignin-aldehyde resin comprising a co-polymer of an activated lignin, an aromatic alcohol, and an aldehyde, wherein the weight ratio of the activated lignin to the aromatic alcohol is about 20:80 to about 95:5.

31. The process or aromatic alcohol-lignin-aldehyde resin according to any one of paragraphs 1 to 30, wherein the weight ratio of the activated lignin to the aromatic alcohol is about 20:80 to about 70:30.

32. The process or aromatic alcohol-lignin-aldehyde resin according to any one of paragraphs 1 to 31, wherein the activated lignin has aromatic carbon atoms plus alkenic carbon atoms to aliphatic carbon atoms in a ratio of about 1.2:1 to about 6:1 based on a quantitative analysis of a $^{13}C$ NMR spectra of the activated lignin.

33. The process or aromatic alcohol-lignin-aldehyde resin according to any one of paragraphs 1 to 32, wherein the aromatic alcohol-lignin-aldehyde resin has a solids content of about 40 wt % to about 60 wt %, based on a weight of the resin, a viscosity of about 500 cP to about 1,500 cP at a temperature of about 25° C., as measured according to ASTM D1084-16, and a gel time of about 20 minutes to about 30 minutes.

34. The process or aromatic alcohol-lignin-aldehyde resin according to any one of paragraphs 1 to 33, wherein the weight ratio of the activated lignin to the aromatic alcohol is about 25:75 to about 90:10.

35. The process or aromatic alcohol-lignin-aldehyde resin according to any one of paragraphs 1 to 34, wherein the weight ratio of the activated lignin to the aromatic alcohol is about 30:70 to about 85:10.

36. The process or aromatic alcohol-lignin-aldehyde resin according to any one of paragraphs 1 to 35, wherein the weight ratio of the activated lignin to the aromatic alcohol is at least 20:80.

37. The process or aromatic alcohol-lignin-aldehyde resin according to any one of paragraphs 1 to 36, wherein the weight ratio of the activated lignin to the aromatic alcohol is at least 25:75.

38. The process or aromatic alcohol-lignin-aldehyde resin according to any one of paragraphs 1 to 37, wherein the weight ratio of the activated lignin to the aromatic alcohol is at least 30:70.

39. The process or aromatic alcohol-lignin-aldehyde resin according to any one of paragraphs 1 to 38, wherein the weight ratio of the activated lignin to the aromatic alcohol is at least 35:65.

40. The process or aromatic alcohol-lignin-aldehyde resin according to any one of paragraphs 1 to 39, wherein the weight ratio of the activated lignin to the aromatic alcohol is at least 40:60.

41. The process or aromatic alcohol-lignin-aldehyde resin according to any one of paragraphs 1 to 40, wherein the weight ratio of the activated lignin to the aromatic alcohol is at least 45:55.

42. The process or aromatic alcohol-lignin-aldehyde resin according to any one of paragraphs 1 to 41, wherein the weight ratio of the activated lignin to the aromatic alcohol is at least 50:50.

43. The process or aromatic alcohol-lignin-aldehyde resin according to any one of paragraphs 1 to 42, wherein the weight ratio of the activated lignin to the aromatic alcohol is at least 55:45.

44. The process or aromatic alcohol-lignin-aldehyde resin according to any one of paragraphs 1 to 43, wherein the weight ratio of the activated lignin to the aromatic alcohol is at least 60:40.

45. A process for making a resin, comprising: heating a first mixture comprising a lignin, an aromatic alcohol, and a base compound to produce a second mixture comprising an activated lignin, the aromatic alcohol and the base compound; wherein the lignin comprises kraft lignin, the aromatic alcohol comprises phenol, the base compound comprises sodium hydroxide, potassium hydroxide, sodium carbonate, potassium carbonate, sodium chloride, potassium chloride, or a mixture thereof, and the activated lignin comprises fragmented lignin, and wherein a weight ratio of the lignin to the aromatic alcohol in the first mixture is about 20:80 to about 95:5; and heating the second mixture and an aldehyde to produce a third mixture comprising an aromatic alcohol-lignin-aldehyde resin and unreacted free aldehyde, wherein the aldehyde comprises formaldehyde.

46. The process or aromatic alcohol-lignin-aldehyde resin according to any one of paragraphs 1 to 45, wherein the aromatic alcohol-lignin-aldehyde resin has a molar ratio of aldehyde to (aromatic alcohol+activated lignin) of about 1.8:1 to about 2.6:1, and wherein a calculation of the molar ratio is based on an average molecular weight of 180 grams per mole for the lignin monomer unit prior to activation of the lignin.

47. The process or aromatic alcohol-lignin-aldehyde resin according to any one of paragraphs 1 to 45, wherein the aromatic alcohol-lignin-aldehyde resin has a molar ratio of aldehyde to (aromatic alcohol+activated lignin) of about 2:1 to about 2.5:1, and wherein a calculation of the molar ratio is based on an average molecular weight of 180 grams per mole for the lignin monomer unit prior to activation of the lignin.

48. The process or aromatic alcohol-lignin-aldehyde resin according to any one of paragraphs 1 to 45, wherein the aromatic alcohol-lignin-aldehyde resin has a molar ratio of aldehyde to (aromatic alcohol+activated lignin) of about 2.2:1 to about 2.5:1, and wherein a calculation of the molar ratio is based on an average molecular weight of 180 grams per mole for the lignin monomer unit prior to activation of the lignin.

49. The process or aromatic alcohol-lignin-aldehyde resin according to any one of paragraphs 1 to 45, wherein the aromatic alcohol-lignin-aldehyde resin has a molar ratio of aldehyde to (aromatic alcohol+activated lignin) of about 2.25:1 to about 2.45:1, and wherein a calculation of the molar ratio is based on an average molecular weight of 180 grams per mole for the lignin monomer unit prior to activation of the lignin.

50. The process or aromatic alcohol-lignin-aldehyde resin according to any one of paragraphs 1 to 45, wherein the aromatic alcohol-lignin-aldehyde resin has a molar ratio of aldehyde to (aromatic alcohol+activated lignin) of about 0.6:1 to about 0.9:1, and wherein a calculation of the molar ratio is based on an average molecular weight of 180 grams per mole for the lignin monomer unit prior to activation of the lignin.

51. The process or aromatic alcohol-lignin-aldehyde resin according to any one of paragraphs 1 to 45, wherein the aromatic alcohol-lignin-aldehyde resin has a molar ratio of aldehyde to (aromatic alcohol+activated lignin) of about 0.6:1 to about 0.85:1, and wherein a calculation of the molar ratio is based on an average molecular weight of 180 grams per mole for the lignin monomer unit prior to activation of the lignin.

52. The process or aromatic alcohol-lignin-aldehyde resin according to any one of paragraphs 1 to 45, wherein the aromatic alcohol-lignin-aldehyde resin has a molar ratio of aldehyde to (aromatic alcohol+activated lignin) of about 0.7:1 to about 0.8:1, and wherein a calculation of the molar ratio is based on an average molecular weight of 180 grams per mole for the lignin monomer unit prior to activation of the lignin.

53. The process or aromatic alcohol-lignin-aldehyde resin according to any one of paragraphs 1 to 45, wherein the aromatic alcohol-lignin-aldehyde resin is a thermosetting resin.

54. The process or aromatic alcohol-lignin-aldehyde resin according to any one of paragraphs 1 to 45, wherein the aromatic alcohol-lignin-aldehyde resin is a thermoplastic resin.

55. An aromatic alcohol-lignin-aldehyde resin comprising a co-polymer of an activated lignin, an aromatic alcohol, and an aldehyde, wherein a weight ratio of the activated lignin to the aromatic alcohol is about 20:80 to about 95:5, wherein the aromatic alcohol-lignin-aldehyde resin has a molar ratio of aldehyde to (aromatic alcohol+activated lignin) of about 1.8:1 to about 2.6:1, and wherein a calculation of the molar ratio is based on an average molecular weight of 180 grams per mole for the lignin monomer unit prior to activation of the lignin.

56. An aromatic alcohol-lignin-aldehyde resin comprising a co-polymer of an activated lignin, an aromatic alcohol, and an aldehyde, wherein a weight ratio of the activated lignin to the aromatic alcohol is about 20:80 to about 95:5, wherein the aromatic alcohol-lignin-aldehyde resin has a molar ratio of aldehyde to (aromatic alcohol+activated lignin) of about 0.6:1 to about 0.85:1, and wherein a calculation of the molar ratio is based on an average molecular weight of 180 grams per mole for the lignin monomer unit prior to activation of the lignin.

Certain examples and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value. As used herein the terms "about" and "approximately" are used interchangeably, and refer to any experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to examples of the present invention, other and further examples of the invention may be devised without departing from the basic scope thereof, and the scope thereof is determined by the claims that follow.

What is claimed is:

1. A process for making a resin, comprising:
    heating a first mixture comprising a lignin starting material, an aromatic alcohol, and a base compound to produce a second mixture comprising an activated lignin, the aromatic alcohol, and the base compound, wherein the lignin starting material is separated from a black liquor, and wherein a weight ratio of the lignin starting material to the base compound in the first mixture is from 60:40 to 77:23; and
    heating the second mixture and an aldehyde to produce a third mixture comprising an aromatic alcohol-lignin-aldehyde resin and unreacted free aldehyde.

2. The process of claim 1, further comprising reacting at least a portion of the unreacted free aldehyde in the third mixture and an aldehyde scavenger to produce a fourth mixture comprising the aromatic alcohol-lignin-aldehyde resin and the unreacted free aldehyde, wherein an amount of the unreacted free aldehyde in the fourth mixture is less than an amount of the unreacted free aldehyde in the third mixture.

3. The process of claim 2, wherein the aldehyde scavenger comprises urea, an aminotriazine, a cycloaliphatic guanamine, 2-cyanoguanidine, ammonium hydroxide, sodium sulfite, sodium bisulfite, or a mixture thereof.

4. The process of claim 1, wherein the aromatic alcohol comprises an aromatic alcohol having a chemical structure of R—(OH)$_n$, wherein R is an aromatic group of 6 to 24 carbon atoms, and n is an integer of 1 to 15, wherein the base compound comprises an oxide of an alkali metal, an oxide of an alkaline earth metal, a hydroxide of an alkali metal, a hydroxide of an alkaline earth metal, a carbonate of an alkali metal, a carbonate of an alkaline earth metal, a tertiary amine, a tertiary amino alcohol, or a mixture thereof, and wherein the lignin starting material comprises a kraft lignin, a lignosulfonate, or a mixture thereof, and wherein the lignin starting material comprises sulfur.

5. The process of claim 1, wherein the first mixture is heated at a temperature of about 40° C. to about 100° C. for about 10 minutes to about 6 hours to produce the second mixture, and wherein the second mixture and the aldehyde are heated at a temperature of about 50° C. to about 100° C. for about 20 minutes to about 8 hours to produce the third mixture.

6. The process of claim 1, wherein a weight ratio of the lignin starting material to the base compound in the first mixture is from 65:35 to 75:25.

7. The process of claim 1, wherein:
a total amount of the aldehyde heated with the second mixture to produce the third mixture is combined with the second mixture in a single aldehyde addition step over a period of time without the addition of any additional base compound to the second mixture prior to combining the total amount of the aldehyde or during the addition of the total amount of the aldehyde,
a weight ratio of the lignin starting material to the aromatic alcohol in the first mixture is from 20:80 to 40:60,
a weight ratio of the lignin starting material to the base compound in the first mixture is from 65:35 to 75:25,
the lignin starting material is a kraft lignin, a lignosulfonate, or a mixture thereof, and
the lignin starting material comprises 1 wt % to 10 wt % of sulfur based on the dry weight of the lignin.

8. The process of claim 1, wherein the lignin starting material comprises 1 wt % to 10 wt % of sulfur based on the dry weight of the lignin.

9. The process of claim 1, wherein the aromatic alcohol-lignin-aldehyde resin has a molar ratio of aldehyde to (aromatic alcohol+activated lignin) of at least 1.8:1, and wherein a calculation of the molar ratio is based on an average molecular weight of 180 grams per mole for the lignin monomer unit starting material prior to activation of the lignin.

10. The process of claim 9, wherein the molar ratio of aldehyde to (aromatic alcohol+activated lignin) is at least 2:1.

11. The process of claim 1, the aromatic alcohol-lignin-aldehyde resin has a solids content of about 40 wt % to about 60 wt % based on a weight of the aromatic alcohol-lignin-aldehyde resin, and a viscosity of at least 700 cP to about 1,500 cP at a temperature of about 25° C., as measured according to ASTM D1084-16.

12. The process of claim 1, wherein:
the aromatic alcohol-lignin-aldehyde resin has a molar ratio of aldehyde to (aromatic alcohol+activated lignin) of at least 1.9:1 to about 2.6:1, wherein a calculation of the molar ratio is based on an average molecular weight of 180 grams per mole for the lignin monomer unit starting material prior to activation of the lignin,
the aromatic alcohol-lignin-aldehyde resin has a solids content of about 40 wt % to about 60 wt % based on a weight of the aromatic alcohol-lignin-aldehyde resin, and a viscosity of at least 600 cP to about 1,500 cP at a temperature of about 25° C., as measured according to ASTM D1084-16, and
a weight ratio of the lignin starting material to the base compound in the first mixture is from 65:35 to 75:25.

13. A process for making an aromatic alcohol-lignin-aldehyde resin comprising:
heating a first mixture comprising a lignin starting material, an aromatic alcohol, and a base compound to produce a second mixture comprising an activated lignin, the aromatic alcohol, and the base compound, wherein the lignin starting material is separated from a black liquor, wherein a weight ratio of the lignin starting material to the aromatic alcohol in the mixture is about 20:80 to about 95:5 and wherein a weight ratio of the lignin starting material to the base compound in the first mixture is from 60:40 to 77:23; and
heating the second mixture and an aldehyde to produce a third mixture comprising the aromatic alcohol-lignin-aldehyde resin and unreacted free aldehyde.

14. The process of claim 13, wherein the lignin starting material comprises a kraft lignin, a lignosulfonate, or a mixture thereof, wherein the lignin starting material comprises 1 wt % to 10 wt % of sulfur based on the dry weight of the lignin, and wherein the weight ratio of the lignin starting material to the base compound in the mixture is from 60:40 to 75:25.

15. The process of claim 13, wherein the aromatic alcohol-lignin-aldehyde resin has a solids content of about 40 wt % to about 60 wt % based on a weight of the aromatic alcohol-lignin-aldehyde resin, and a viscosity of at least 600 cP to about 1,500 cP at a temperature of about 25° C., as measured according to ASTM D1084-16.

16. The process of claim 13, wherein the aromatic alcohol-lignin-aldehyde resin has a molar ratio of aldehyde to (aromatic alcohol+activated lignin) of at least 1.8:1 to about 2.6:1, wherein a calculation of the molar ratio is based on an average molecular weight of 180 grams per mole for the lignin monomer unit starting material prior to activation of the lignin, and wherein the weight ratio of the lignin starting material to the base compound in the mixture is from 60:40 to 75:25.

17. The process of claim 13, wherein the aromatic alcohol-lignin-aldehyde resin has a solids content of about 40 wt % to about 60 wt %, based on a weight of the aromatic alcohol-lignin-aldehyde resin, a viscosity of at least 700 cP to about 1,500 cP at a temperature of about 25° C., as measured according to ASTM D1084-16, and a gel time of about 20 minutes to about 30 minutes at a temperature of about 100° C.

18. The process of claim 13, wherein the lignin starting material is a kraft lignin, a lignosulfonate, or a mixture thereof, and wherein the lignin starting material comprises 1 wt % to 10 wt % of sulfur based on the dry weight of the lignin.

19. The process of claim 13, wherein the weight ratio of the lignin starting material to the aromatic alcohol in the mixture is from 20:80 to 35:65.

* * * * *